United States Patent [19]
Buell

[11] Patent Number: 4,964,484
[45] Date of Patent: Oct. 23, 1990

[54] MOTORCYCLE FAIRING

[75] Inventor: Erik Buell, Mukwonago, Wis.

[73] Assignee: Buell Motor Company, Inc., Mukwonago, Wis.

[21] Appl. No.: 335,097

[22] Filed: Apr. 6, 1989

[51] Int. Cl.⁵ ............ B60K 11/08; B62D 23/00; B62D 61/02

[52] U.S. Cl. ............ 180/219; 180/68.1; 180/229; 280/288.2; 296/78.1; 296/208

[58] Field of Search ........... 180/219, 227, 229, 231, 180/68.1, 68.2; 250/274, 275, 276, 277, 279, 284, 285, 288, 288.2, 288.3; 296/78.1, 208

[56] References Cited

U.S. PATENT DOCUMENTS

| | | | |
|---|---|---|---|
| 4,411,333 | 10/1983 | Bothwell | 180/219 |
| 4,633,965 | 1/1987 | Tsurumi et al. | 280/288.2 X |
| 4,678,223 | 7/1987 | Kishi et al. | 296/78.1 |
| 4,703,825 | 11/1987 | Mikami et al. | 180/229 |
| 4,818,012 | 4/1989 | Kohama et al. | 296/78.1 |
| 4,830,135 | 5/1989 | Yamashita | 180/229 |

FOREIGN PATENT DOCUMENTS 248619 12/1987 European Pat. Off. ............ 180/229

Primary Examiner—Mitchell J. Hill
Attorney, Agent, or Firm—Andrus, Sceales, Starke & Sawall

[57] ABSTRACT

A motorcycle fairing for enclosing the engine and other components of a motorcycle includes a pair of body portions, each of which has a forward segment and a rear segment connected by a leg receiving recess. Air introduced at the front of the fairing to cool the engine is released from the engine cavity at a point adjacent the leg recesses so that the laminar flow of air around the motorcycle is not disturbed by the leg recesses.

8 Claims, 2 Drawing Sheets

MOTORCYCLE FAIRING

BACKGROUND OF THE INVENTION

The present invention relates to a motorcycle fairing for enclosing the engine and other components of the motorcycle and more particularly to a fairing having an advanced air ducting system that promotes a smooth laminar air flow along the length of the motorcycle.

High performance motorcycles designed for racing and touring motorcycles designed for lengthy highway travel utilize fairings to form a body around the motor and other components so that the motorcycle presents a streamlined profile that enhances its movement through the air.

Motorcycles of this type had the laminar air flow disrupted by the introduction of on-rushing air into the motor cavity and by the irregular flow patterns caused by the low pressure drop off experienced in the area of the leg recesses of the fairing. The ensuing air drag inhibited the performance characteristics of the motorcycle.

Therefore, it is an object of the present invention to provide a motorcycle fairing that encloses the motor cavity of the motorcycle and which circulates cooling air in the motor cavity in such a way that the laminar flow characteristics adjacent to leg recesses are enhanced.

SUMMARY OF THE INVENTION

A motorcycle fairing for enclosing the engine and other components of the motorcycle includes a pair of body portions that have forward and rear segments connected by a leg receiving recess.

In accordance with one aspect of the invention, the left and right body portions define an air inlet port for introducing moving air into the motor cavity.

In accordance with another aspect of the invention, the left and right body portions are provided with a plurality of air outlet vents that are disposed outwardly and substantially adjacent the leg recesses so that air exiting the outlet vents will become part of and contribute to the laminar air flow across the leg recesses.

In accordance with still another aspect of the invention, the motor cavity is provided with a pair of surfaces that extend rearwardly from the side edges of the inlet port toward the outlet vents to direct and smooth the air flow through the motor cavity toward the outlet vents.

The present invention thus provides a motorcycle fairing that utilizes the engine cooling air to enhance the laminar air flow across the leg recesses of the fairing.

BRIEF DESCRIPTION OF THE DRAWINGS

The drawings illustrate the best mode presently contemplated of carrying out the invention.

In the drawings.

DETAILED DESCRIPTION OF THE PREFERRED EMBODIMENT

Figure 1:
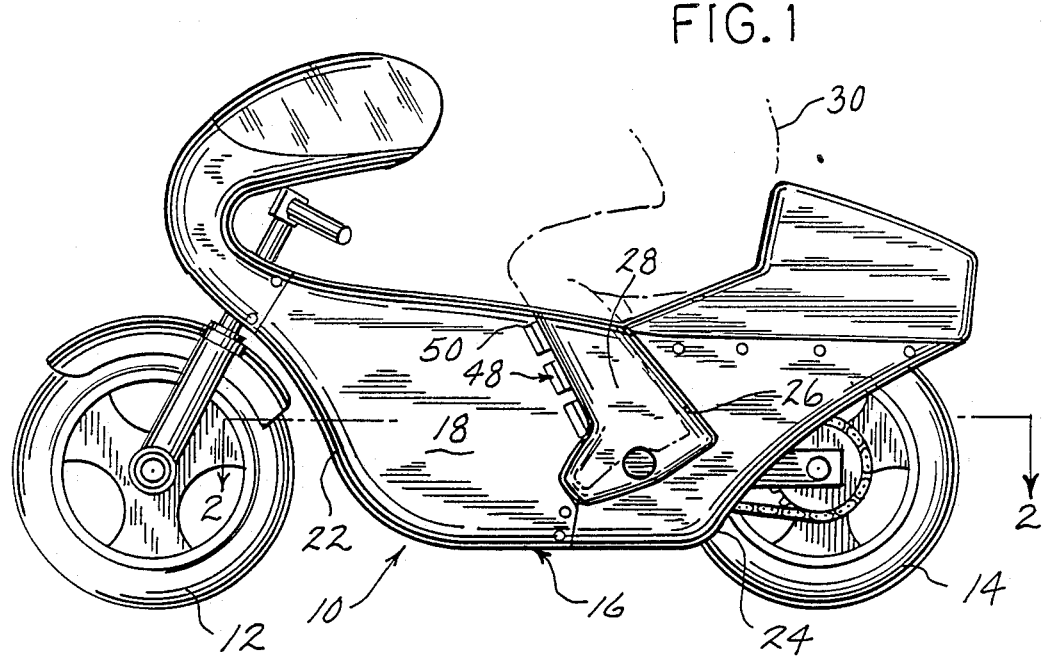
FIG. 1 is a side view of a motorcycle constructed according to the present invention.
Figure 2:
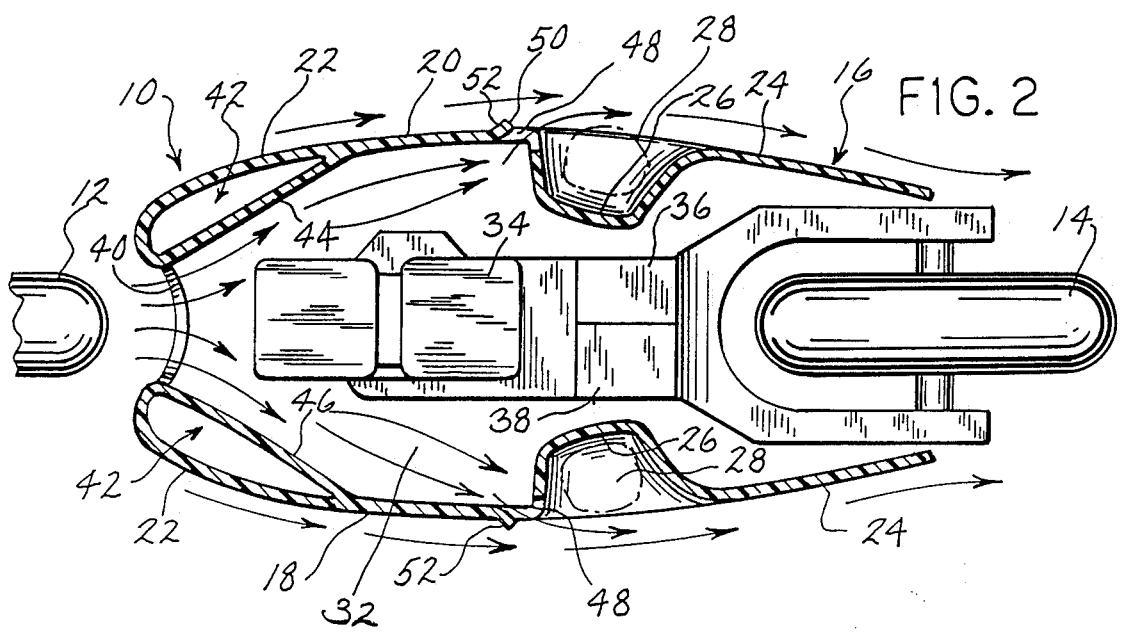
FIG. 2 is a sectional view along the line 2—2 of FIG. 1.

As illustrated in FIG. 1 and FIG. 2, a motorcycle 10 having a front wheel 12 and a rear wheel 14 is provided with a fairing 16 that gives the motorcycle a streamlined appearance and enhances the movement of the motorcycle through an airstream.

Fairing 16 includes a left body portion 18 and right body portion 20. Each of body portions 18 and 20 is provided with a forward segment 22, a rear segment 24 and a leg receiving recess 26 disposed between forward segment 22 and rear segment 24. Leg receiving recess 26 is of a depth such that the leg 28 of rider 30 will not protrude beyond the curved surface defined by forward segment 22 and rear segment 24.

Body portions 18 and 20 define a cavity 32 in which the engine 34, battery 36 and oil tank 38 are disposed.

The cooling of engine 34 is accomplished by introducing on-rushing air through an air inlet port 40 disposed between forward segments 22. As the air enters inlet port 40, its progress is directed by deflecting means 42 in the form of a pair of surfaces 44 and 46 that extend rearwardly from the left and right edges of inlet port 40.

The on-rushing air is allowed to exit cavity 32 through a series of air outlet ports 48 disposed at the rear of forward segments 22 at a point immediately adjacent leg recesses 26.

Outlet ports 48 may have a number of different configurations. For example, in FIGS. 1 and 2 outlet ports 48 are in the form of a plurality of vertically arrayed slots 50 that have a slightly raised lip 52 at the forward edge of the slot.

Figure 5:
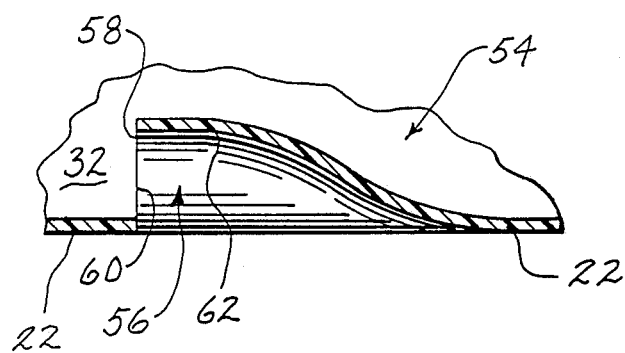
FIG. 5 is a sectional view along the line 5—5 of FIG. 4.
Figure 4:
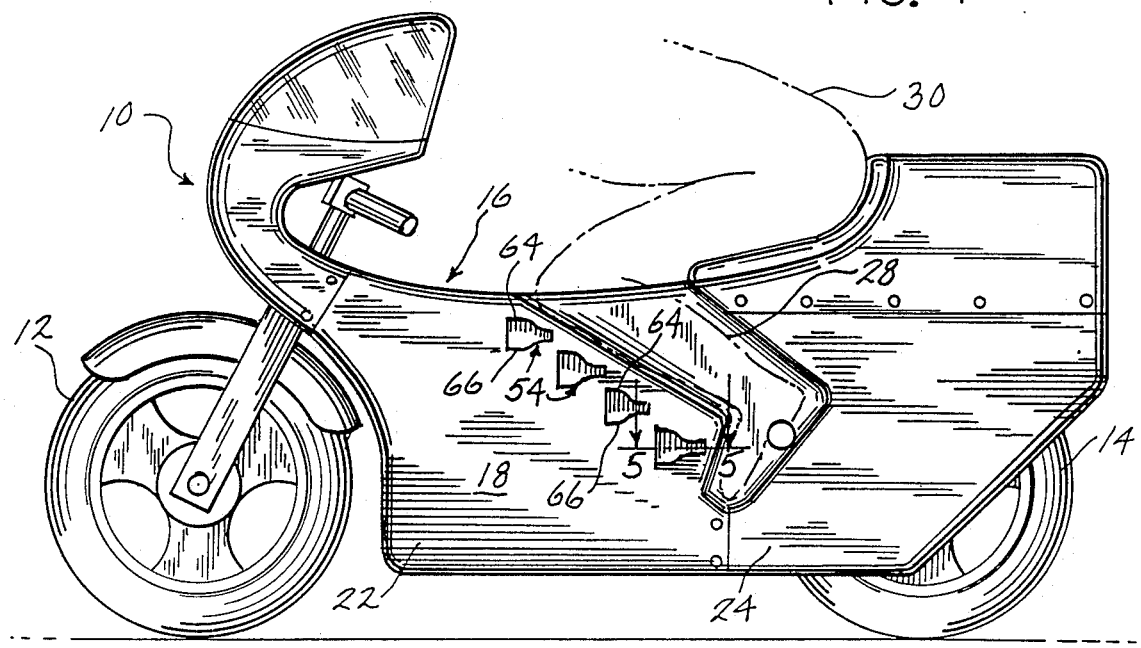
FIG. 4 is a side view of yet another embodiment of the invention.

In FIG. 4, outlet ports 48 are in the form of vortex generators 54. The sectional view of FIG. 5 shows that vortex generator 54 comprises a recess 56 within the surface of forward segment 22. Recess 56 is provided with a forward wall 58 which has an opening 60 communicating with cavity 32. Sidewall 62 of recess 56 tapers outwardly from front to rear toward forward segment surface 22 while upper and lower edges 64 and 66 respectively of recess 56 converge toward each other along a line from the front to the rear of the recess.

Outlet ports 48 are disposed in a vertical array that substantially parallels the longitudinal axis of elongated leg recess 26 which is disposed at an angle such that the upper portion of leg recess 26 is disposed forwardly of the bottom portion of leg recess 26.

Figure 3:
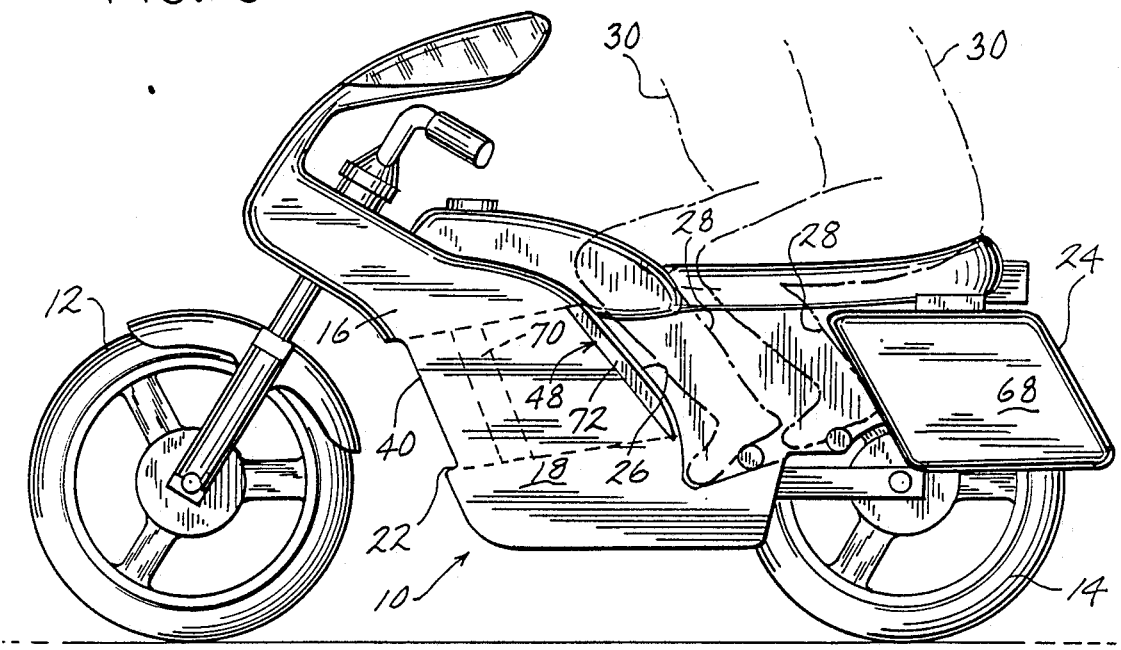
FIG. 3 is a side view of an alternate embodiment of the invention.

FIG. 3 illustrates an alternate embodiment of the invention in which a streamlined luggage carrier forms rear cowling segment 24 and the width of leg recess 26 is expanded to accomodate the legs of a pair of riders. In the embodiment shown in FIG. 3, air entering inlet port 40 is directed across a radiator 70 that forms a part of the cooling system and outlet port 48 is in the form of an elongated slot 72 located adjacent leg recess 26. The embodiment of FIG. 3 is of the type utilized on a touring motorcycle.

As seen in FIG. 2, the disposition of air outlet ports 48 at a point substantially adjacent the leading edge of leg recess 26 allows the air exiting cavity 32 to become part of and contribute to the laminar air flow along fairing 16 and across leg recess 26. Thus, the ducting of air into and out of cavity 32 at a point adjacent the leg recesses enhances the laminar flow of air around the motorcycle and eliminates the turbulence typically caused by leg recesses in the fairing.

Various modes of carrying out the invention are contemplated as being within the scope of the following claims particularly pointing out and distinctly claiming the subject matter which is regarded as the invention.

I claim:

1. A motorcycle fairing for enclosing the engine and other components of the motorcycle and providing a streamlined surface, said fairing comprising:
   a left body portion and a right body portion, each of said portions having a forward segment disposed fowardly of the rider's leg and a rear segment disposed rearwardly of the rider's leg and a leg receiving recess disposed between said forward and rear segments,
   said left and right body portions defining a cavity with the engine and other components of the motorcycle disposed within said cavity,
   an air inlet port disposed between said forward segments of said left and right body portions for introducing moving air into said cavity to cool the engine,
   at least one air outlet port disposed at the rear of said forward segment immediately adjacent said leg recess so that air exiting said cavity from said outlet port will become part of and contribute to the laminar air flow across said recess.

2. The motorcycle fairing defined in claim 1 wherein said air outlet port comprises a series of vents disposed in a vertical array along a rear portion of each of said forward segments of said left and right body portions.

3. The motorcycle fairing defined in claim 2 wherein each of said vents comprises a recess within a surface on said forward segment with said recess having a forward wall in which is disposed an opening communicating with said cavity, said recess tapering outwardly from front to rear toward said forward segment surface.

4. The motorcycle fairing defined in claim 3 wherein said recess includes upper, lower, front and rear edges with said upper and lower edges of said recess converging toward each other from said front of said recess to the rear.

5. The motorcycle fairing defined in claim 2 wherein said leg recess is an elongated recess disposed at an angle so that an upper portion of said leg recess is disposed forwardly of a bottom portion of said leg recess and said vents are disposed along a line substantially parallel to the longitudinal axis of said leg recess.

6. The motorcycle fairing defined in claim 1 further comprising deflecting means disposed within said cavity substantially adjacent said inlet port to direct and smooth air flow through said cavity toward said outlet port.

7. The motorcycle fairing defined in claim 6 wherein said deflecting means comprises a pair of surfaces extending rearwardly from each of a left and right edge of said inlet port toward said outlet port.

8. A motorcycle fairing for enclosing the engine and other components of the motorcycle and providing a streamlined surface, said fairing comprising:
   a left body portion and a right body portion, each of said portions having a forward segment disposed fowardly of the rider's leg and a rear segment disposed rearwardly of the rider's leg and a leg receiving recess disposed between said forward and rear segments,
   said left and right body portions defining a cavity with the engine and other components of the motorcycle disposed within said cavity,
   an air inlet port disposed between said forward segments of said left and right body portions for introducing moving air into said cavity to cool the engine,
   a series of outlet vents disposed in a vertical array along a rear portion of each of said forward segments of said left and right body portions immediately adjacent said leg recesses so that air exiting said cavity from said vents will become part of and contribute to the laminar air flow across said recesses.

* * * * *

UNITED STATES PATENT AND TRADEMARK OFFICE
CERTIFICATE OF CORRECTION

PATENT NO. : 4,964,484

DATED : October 23, 1990

INVENTOR(S) : ERIK BUELL

It is certified that error appears in the above-identified patent and that said Letters Patent is hereby corrected as shown below:

Claim 8, Col. 4, line 36: After "portions" insert-
---substantially---.

Signed and Sealed this

Sixteenth Day of June, 1992

Attest:

DOUGLAS B. COMER

*Attesting Officer*    *Acting Commissioner of Patents and Trademarks*